UNITED STATES PATENT OFFICE.

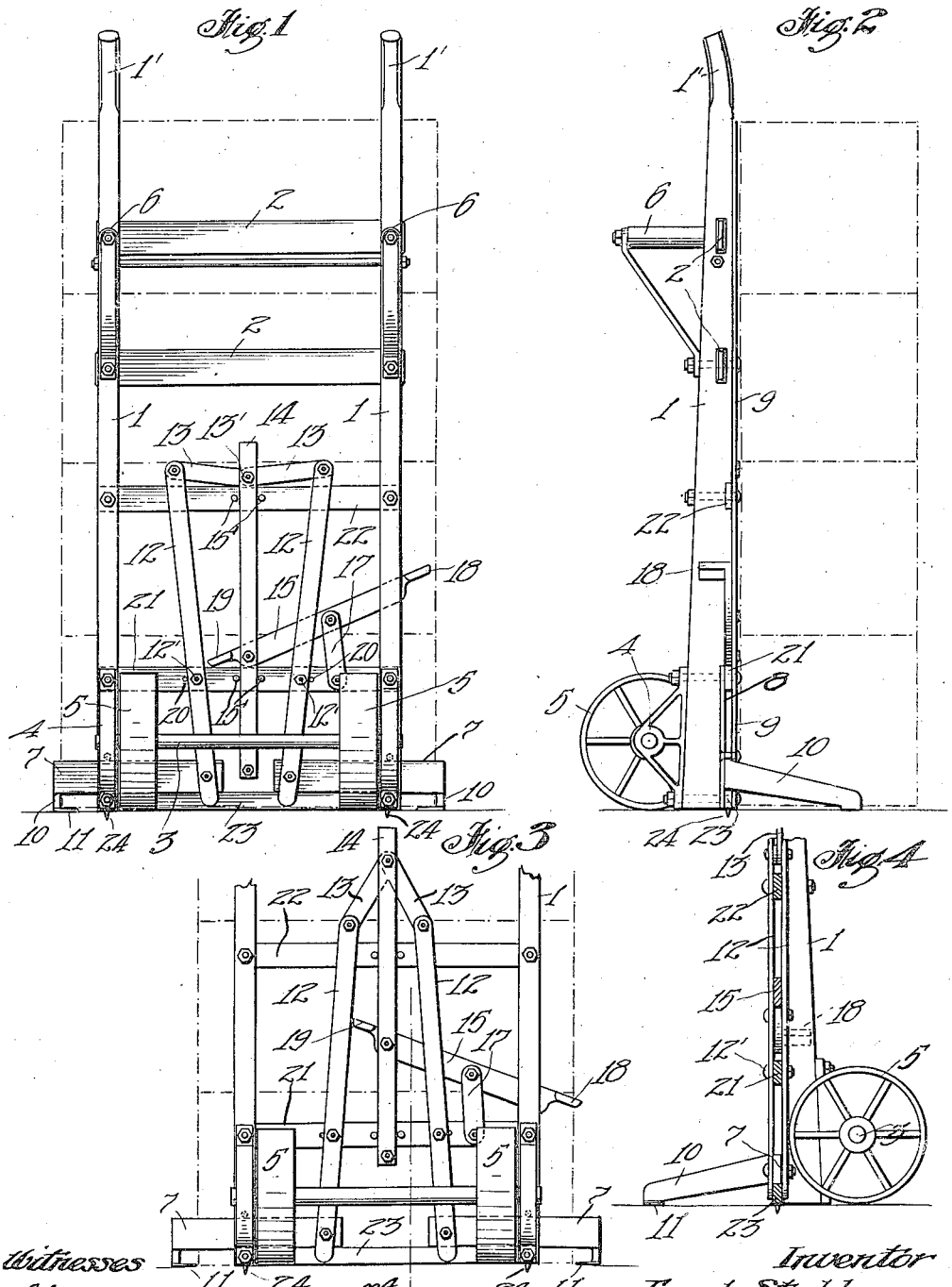

FRED STEBLER, OF RIVERSIDE, CALIFORNIA.

HAND-TRUCK.

990,402. Specification of Letters Patent. Patented Apr. 25, 1911.

Application filed April 16, 1906. Serial No. 311,918.

*To all whom it may concern:*

Be it known that I, FRED STEBLER, a citizen of the United States, residing at Riverside, in the county of Riverside and State of California, have invented a new and useful Improvement in Hand-Trucks, of which the following is a specification.

This invention relates to hand trucks which are provided with means for clamping or holding boxes thereon and for taking up the boxes from the floor or depositing them on the floor, and the main object of the invention is to provide means for this purpose which will be simple and effective in operation.

A further object of the invention is to provide box-engaging means which will be adapted to engage under the boxes instead of with the walls thereof, thereby avoiding mutilation of the box walls, and at the same time giving a more secure hold on the boxes and easy release therefrom.

Another object of the invention is to provide operating means for the box-engaging devices which will be automatically held in closed or gripping position.

The accompanying drawings illustrate the invention.

Figure 1 is a rear elevation of the truck in raised and loaded position. Fig. 2 is a side elevation thereof. Fig. 3 is a rear elevation of the lower part of the truck, showing the box-holding device in disengaged position. Fig. 4 is a vertical section on the line $x^4$—in Fig. 3.

The truck frame may consist of the usual longitudinal bars 1, provided with handles 1', cross bars 2, axle 3, journaled in bearings 4 on the longitudinal bars, and carrying truck wheels 5, and legs 6, onto which the truck is turned down when in lowered position. At the lower or forward end of the truck are mounted two sliding clamps formed with slides 7 to slide laterally through guides formed between iron strips 8, 9, secured to the longitudinal bars of the truck frame, each clamp being formed with an arm 10 extending forwardly from the truck and provided at its end with an inturned flange or spur 11 adapted to engage under a box, or between a box and floor. Two levers 12 are pivoted to the iron cross bar 21 of the truck frame at 12', the lower ends of said levers being loosely pivoted to the slides 7 so as to permit the latter to move in a straight line when the levers are swung in either direction upon their pivots. The upper ends of the levers are pivoted to toggle links 13 which are pivotally connected at their knuckle or joint 13' to the vertically extending slide bar 14, working and guided between pins 15' projecting from the cross bars 21, 22 of the truck frame, so that vertical movement of said slide bar will cause movement of the links to draw the upper ends of the levers inward, or to push them outward, as will be hereinafter set forth. Such movement of the slide bar is effected by a foot lever 15, pivoted to the upper end of a link 17, and the lower end of said link being pivoted to the lower cross-bar 21 of the truck frame, said lever 15 having a treadle portion 18 at its outer end beyond the side of the truck frame and a treadle portion 19 at its inner end, both of these treadle portions extending rearwardly, so as to be in convenient position for the application of the operator's foot. Near its outer end the operating lever 15 passes between the metal strip 9 on the truck frame and the adjacent side bar 1 of the frame, so as to guide the said lever. The levers 12 are preferably made double and extend on both sides of cross bars 21, 22, 23. The levers 12 are thereby guided in such manner as to brace the sliding clamps in their gripping action. The bar 23 is at the extreme forward end of the truck, and is provided with two spurs 24 that prevent lateral displacement of the truck by engaging in the floor when the truck is tipped forward. To enable adjustment of the levers 12, the cross bar 21 has a plurality of perforations 20 to receive the pivot-bolt 12' for each lever, so that the throw or position of the clamp slides can be adjusted or varied to fit the different sizes of boxes.

In operation, when the truck is to be used in lifting and transporting boxes, the parts will be brought into position shown in Fig. 3, by pressing the foot on the treadle 18 at the outer end of the foot lever 15, thereby lifting the slide-bar 14, drawing the inner ends of links 13 upwardly and causing their ends to swing or pull together, drawing inward the upper ends of levers 12 and correspondingly throwing outward the lower ends of said levers and the clamps connected thereto. On then bringing the truck to position alongside of the boxes, as shown in Fig. 2, and pressing the foot on the treadle 19 at the inner end of the foot lever 15, the slide-bar 14 is depressed to position shown in Fig. 1, straightening out the toggle formed by the links 13, separating the upper ends of the levers 12 and causing the lower ends thereof to draw together and to pull the sliding clamps inwardly so that the spurs 11 are pushed in under the box which rests on the floor in front of the truck. The said spurs are sharpened or made sufficiently thin so that they will readily enter beneath the bottom of the box in this operation. When the clamp devices are thus drawn in, their arms 10 will rest against the sides of the said box and hold the same firmly from lateral displacement, the weight of the box, however, being taken substantially by the spurs 11. It will be noted that in this operation there is no pressing or squeezing of the clamp devices into the side of the box and therefore no mutilation of the box walls; the box, or as would generally be the case, a series or stack of boxes, being supported by the spurs extending beneath the lower box. The operating toggle members 13 being substantially on dead center when the clamps are in closed or operated position, it follows that any lateral strain on the clamps cannot result in movement of the operating devices and the parts are thereby held from accidental displacement. It is, in fact, preferred to so construct the operating devices that when the parts are in this operative position the said toggle links will be somewhat below or past the dead center position and any strain thereon would therefore serve to more effectually lock them in place.

What I claim is:—

1. In combination with a hand truck, clamp devices mounted to slide laterally thereon at the forward end thereof and provided with spurs to extend under the box, levers pivotally connected to the aforesaid slides and pivoted on the truck, toggle links pivoted to said levers, a slide pivoted to the joint of said toggle links, and an operating lever connected to said slide, said slide and toggle links being movable to carry the toggle beyond the dead center to lock the clamp devices when in closed position.

2. In combination with a hand truck, clamp devices mounted to slide laterally thereon at the forward end thereof and provided with spurs to extend under the box, levers pivotally connected to the aforesaid clamps and pivoted on the truck, toggle links pivoted to said levers, a slide pivoted to the joint of said toggle links, a foot lever connected to said slide, and a laterally moving link on this said lever pivotally supported on the truck frame.

3. The combination, with a hand truck, of two straight, longitudinally slidable clamping devices, two levers pivotally connected with the truck and loosely connected with said devices at one end, a longitudinally movable member connected with said levers to actuate said clamps, and a lever pivotally connected with said member and provided with a movable fulcrum.

4. The combination, with a hand truck, of two clamping devices, two levers pivotally connected with the truck and with said devices at one end, two toggles connected with said levers at the other end, a longitudinally movable member connected with said toggles, a link, and a lever pivotally mounted on said link and connected with said member at one end, each end of said lever being adapted to be actuated for operating the clamping devices.

5. In combination with a hand truck, clamping means mounted to move thereon rectilinearly and transversely to the truck, and operating means for the clamping means, said operating means comprising a toggle moving to the locking position when the clamping devices are in closed position.

6. The combination, with a hand truck provided with cross pieces one of which is at the bottom, of levers pivotally secured to another of said cross pieces and extending above another cross piece at the upper end and over the bottom cross piece at the lower end, each lever comprising two members which are located upon opposite sides of said cross pieces, said members being secured together at their upper ends above the upper cross piece and at a point above the bottom cross piece at their lower ends, a longitudinally movable clamping member pivotally secured at its inner end between the lower ends of each lever, a link pivotally secured between the upper ends of each lever, the adjacent ends of which are joined together and adapted to engage with the upper cross piece and lock the clamping members against outward movement, a longitudinally movable member connected with the adjacent ends of said links to move them toward and from said upper cross piece to actuate the clamping devices, and means for actuating the member connected with said links.

In testimony whereof, I have hereunto set my hand at Riverside California this 6th day of April 1906.

FRED STEBLER.

In presence of—
R. L. RICHEY,
F. E. DENSMORE.